ized by the telephone answering apparatus. The apparatus includes an oscillator coupled to an input/output transducer for generating a tone of a predetermined frequency which is coupled via a telephone to the automatic telephone answering apparatus. The tone switches the answering apparatus into a high speed rewind mode wherein the message information is not muted. The message information is recorded in reverse on a magnetic tape in the transcribing apparatus by a tape transport mechanism transporting the tape in a forward direction during a record operation. During playback, the tape transport mechanism transports the tape in the reverse direction so that the reverse recorded message information is played back in an intelligible manner to convey the recorded message information. The transcribing device also includes a tape position indicator for providing a visual indication of the amount of message information transcribed from the automatic telephone answering apparatus as well as a positive indication of the position of the tape relative to the record/playback head of the transcribing device.

United States Patent
Zimmermann

[19]
[11] 3,953,680
[45] Apr. 27, 1976

[54] REMOTE CONTROL TRANSCRIBING DEVICE
[75] Inventor: Joseph J. Zimmermann, Elm Grove, Wis.
[73] Assignee: GTE Automatic Electric Laboratories Incorporated, Northlake, Ill.
[22] Filed: Dec. 4, 1974
[21] Appl. No.: 529,328

[52] U.S. Cl. .............................. 179/6 E; 179/6 R; 179/100.1 DR; 360/8
[51] Int. Cl.² .................... G11B 5/86; H04M 11/10
[58] Field of Search ............... 179/6 E, 6 R, 6 AC, 179/100.1 R, 100.1 S, 100.1 DR; 360/8, 137

[56] References Cited
UNITED STATES PATENTS

| | | | |
|---|---|---|---|
| 2,281,405 | 4/1942 | Barrish et al. | 360/8 |
| 3,678,484 | 7/1972 | Maxwell, Jr. | 360/8 |
| 3,757,057 | 9/1973 | Fleming | 179/100.1 DR |
| 3,863,029 | 1/1975 | Zimmermann | 179/6 E |

Primary Examiner—Bernard Konick
Assistant Examiner—Alan Faber
Attorney, Agent, or Firm—Robert J. Black

[57] ABSTRACT

Apparatus for remotely controlling automatic telephone answering devices or the like to transcribe message information magnetically recorded by the telephone answering apparatus. The apparatus includes an oscillator coupled to an input/output transducer for generating a tone of a predetermined frequency which is coupled via a telephone to the automatic telephone answering apparatus. The tone switches the answering apparatus into a high speed rewind mode wherein the message information is not muted. The message information is recorded in reverse on a magnetic tape in the transcribing apparatus by a tape transport mechanism transporting the tape in a forward direction during a record operation. During playback, the tape transport mechanism transports the tape in the reverse direction so that the reverse recorded message information is played back in an intelligible manner to convey the recorded message information. The transcribing device also includes a tape position indicator for providing a visual indication of the amount of message information transcribed from the automatic telephone answering apparatus as well as a positive indication of the position of the tape relative to the record/playback head of the transcribing device.

7 Claims, 2 Drawing Figures

REMOTE CONTROL TRANSCRIBING DEVICE

BACKGROUND OF THE INVENTION

The present invention relates generally to apparatus for remotely controlling tape recorders and the like to retrieve information therefrom and more particularly to a remote control transcribing device for controlling an automatic telephone answering apparatus from a remote location to transcribe information stored by the telephone answering apparatus.

Reference may be made to the following U.S. Pat. Nos. 3,716,241; 3,691,300; 3,027,425; 3,678,484; 3,736,380; 3,712,961; 3,524,026; 3,499,993; 3,443,032; 3,405,234; 3,324,245; 2,936,336; and 2,866,852.

Remotely controlled telephone answering devices are commonly used to receive and record telephone messages whenever a home or place of business is left unattended. In the absence of the device's user, other persons, upon calling and receiving a pre-recorded message informing them that the user is out, are invited to have their messages recorded by the device for the user's attention when he returns or calls in from a remote location. One advantage of remotely controlled answering devices is that the user may often times find it more practical to call in to receive messages recorded in his absence rather than returning to his home or office. Since the messages recorded in his absence may dictate his subsequent course of action, the user can then more efficiently schedule his time.

Often, however, when calling in from a remote location, the user for various reasons may have only a limited time in which to play back the recorded messages. For example, the recorded messages may have consumed many minutes of recording time while the user has only a few minutes to listen to the messages before he must be at his next appointment. Accordingly, it would be advantageous if means could be provided for reducing the time required to receive or transcribe the messages recorded by the automatic answering device.

Existing remote control transcribing devices, however, have generally required complex circuitry for triggering, seizing, and indexing the remote telephone answering machine and for performing functions necessary to satisfactorily retrieve the message information from the telephone answering apparatus.

Moreover, most existing remotely controlled telephone answering devices do not include means for indicating either the amount of tape used or the time elapsed in recording messages during the user's absence. Thus, even though the recorded messages can be transcribed back in a substantially reduced amount of time, the user does not have any information available on which to base his decision whether or not he will have enough time to listen to all of the recorded messages. Once the message information is transcribed, knowledge of the tape position or the amount of elapsed recording time would enable the user to decide whether he should play back the messages immediately or postpone the playback to a more convenient time.

SUMMARY OF THE INVENTION

The simplified transcribing device of the present invention requires a minimum of "on-line" time to transcribe message information in bulk from the tape recorder apparatus of a remotely located telephone answering apparatus under the remote control of the transcribing device. Moreover, the transcribing device also provides a visual indication of the amount of message information transcribed and a positive indication of tape position.

More particularly, the remote control transcribing apparatus comprises means for generating a tone of a predetermined frequency and selectively applying the tone to the remote tape recorder to switch the remote tape recorder into a high speed rewind mode so that the message information is played back in reverse. Means are also included for coupling the reverse message information to the record/playback head of the transcribing apparatus which magnetically records the reverse message information on a magnetic recording tape being transported at a high speed in a forward direction by a tape transport means included in the transcribing apparatus. Means are provided for subsequently switching the tape transport means to transport the tape in a reverse direction at low speed while means coupled to the record/playback head plays back the reverse message information in an intelligible manner. Means are also included for providing a visual indication of the amount of the message information transcribed and a positive indication of the position of the tape with respect to the record/playback head.

BRIEF DESCRIPTION OF THE DRAWINGS

The features of this invention which are believed to be novel are set forth with particularity in the appended claims. The invention together with its further objects and advantages thereof, may be best understood, however, by reference to the following description taken in conjunction with the accompanying drawing, in which like reference numerals identify like elements in the several figures and in which:

DETAILED DESCRIPTION

Figure 1:
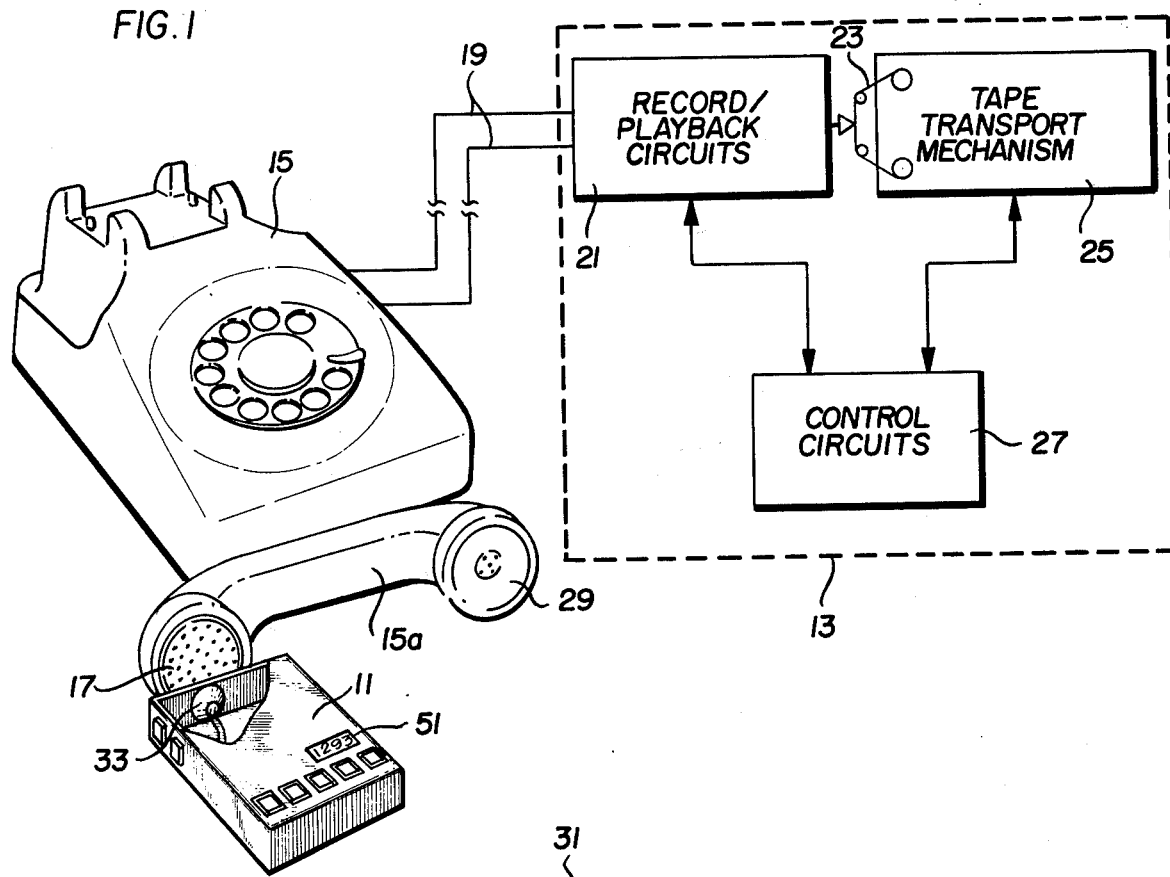
FIG. 1 illustrates the operative relationship between the remote control transcribing device of the present invention and the automatic telephone answering apparatus.

With reference now to FIG. 1, a remote control transcribing device 11 is shown in operative relationship with an automatic telephone answering apparatus 13 for transcribing or retrieving recorded message information therefrom at a remotely located telephone 15. In particular, the remote control transcribing device 11 is positioned adjacent the transmitter 17 of the telephone handset 15a coupled to the telephone 15. The remotely located telephone 15, in turn, is coupled to the automatic telephone answering apparatus 13 via telephone lines 19.

Although any of several types of well known answering units would be suitable for use with the remote control transcribing device of the present invention, the particular automatic telephone answering apparatus 13 used in the present embodiment, as illustrated in FIG. 1, generally comprises a tape recorder apparatus having record/playback circuits 21 coupled to the telephone lines 19 for receiving and processing the message information comprising incoming telephone calls. The processed message information is then magnetically recorded on a magnetic recording tape 23, or any other suitable recording medium, being transported in a forward direction by a tape transport mechanism 25 under the direction of the control circuits 27 coupled to the record/playback circuits 21 and the tape transport mechanism 25.

In order to retrieve recorded message information from the answering apparatus 13, the user or subscriber dials the telephone number with which the automatic answering apparatus 13 is associated in a conventional manner to seek control of the apparatus 13. After gaining access to the automatic telephone answering apparatus 13, an audio tone of a predetermined frequency is generated by selectively enabling a tone generating means in the remote control transcribing device 11 while the transcribing device 11 is held against or close to the telephone transmitter 17. The tone is coupled to the automatic telephone answering apparatus 13 by the telephone 15 to switch the answering apparatus 13 into the rewind mode of operation.

In the rewind mode, the magnetic recording tape 23 is rewound at a constant, high speed by the tape transport mechanism 25. During the rewind operation, the message information is not muted, but is instead played back to the transcribing device 11 over the telephone lines 19 at high speed and in the reverse direction. Accordingly, the message information played back from the automatic telephone answering apparatus 13 and recorded by the remote control transcribing device 11 is reversed and is therefore unintelligibly garbled. During playback, the remote control transcribing device 11 may be repositioned to the receiver 29 of the telephone handset 15a to receive the message information prior to the playback thereof. Of course, if the sensitivity of the transcribing device 11 is sufficiently high, the transcribing device 11 will not have to be repositioned.

Figure 2:
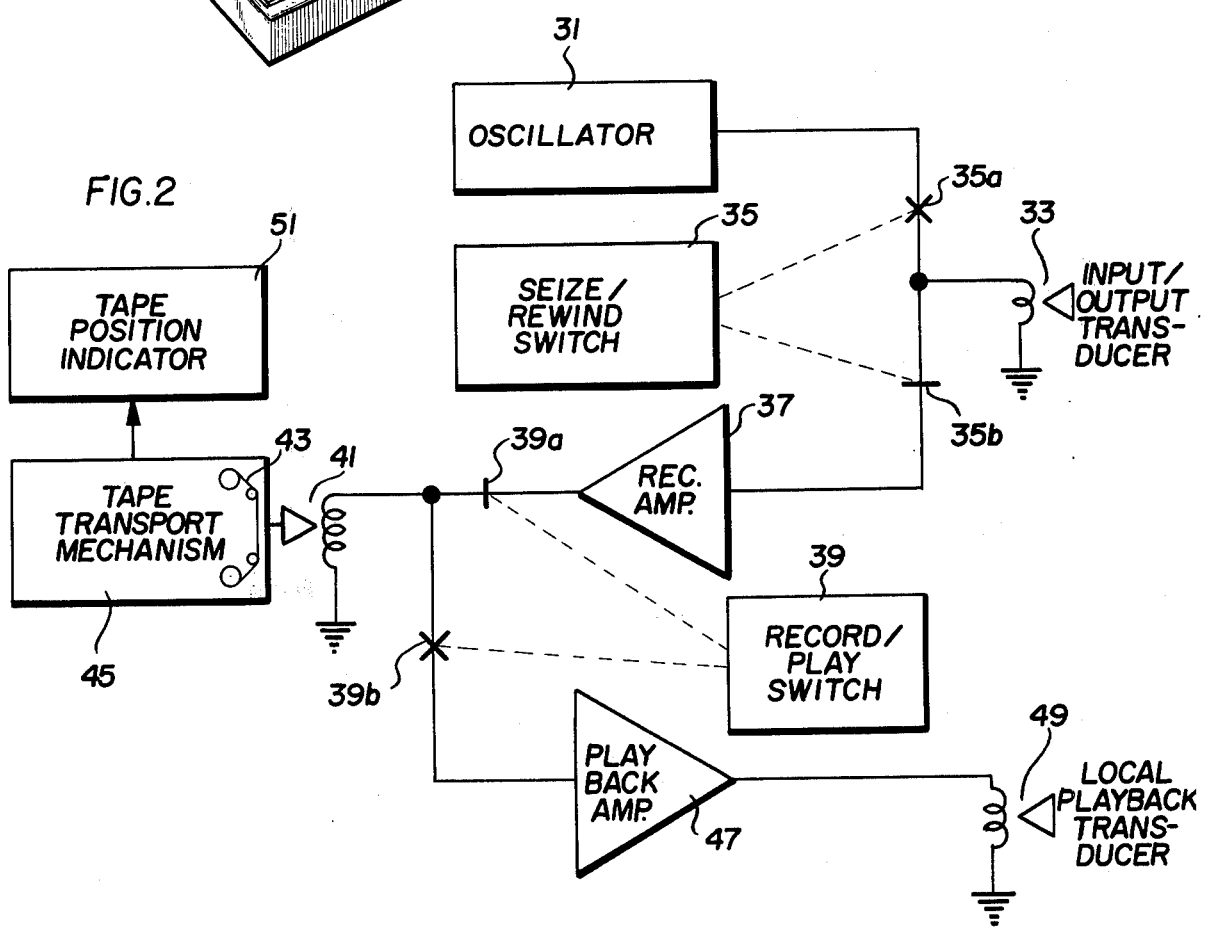
FIG. 2 is a combined schematic and block diagram illustrating in greater detail the remote control transcribing device shown in FIG. 1.

The remote control transcribing device 11 is shown in greater detail in FIG. 2. More specifically, in the present embodiment, the remote control transcribing device 11 comprises a sub-miniature tape recorder having an oscillator 31 for generating an electrical signal of a predetermined frequency and further having an input/output transducer 33 coupled to the oscillator 31 and referenced to ground for converting the oscillator output signal to the audio tone used to control the operation of the automatic telephone answering apparatus 13. A seize/rewind switch 35 having a pair of normally open contacts 35a interposed in a line between the oscillator 31 and the transducer 33 is selectably closed to couple the oscillator signal to the transducer 33. The audio tone picked up by the telephone transmitter 17 switches the automatic telephone answering apparatus 13 into the rewind mode of operation for reverse playback of the messages recorded on tape 23.

Simultaneously with the automatic telephone answering apparatus 13 being switched to the rewind mode, the seize/rewind switch 35 is released to open contacts 35a, and the message information from answering apparatus 13 is coupled through the transducer 33 to the input of a record amplifier 37 via the normally closed contacts 35b of the seize/rewind switch 35. In turn, the amplified message information is coupled through the normally closed contacts 39a of a record/play switch 39 to the record/playback head 41 which magnetically records the information on a magnetic tape 43 being transported in the forward direction by a tape transport mechanism 45 in the transcribing device 11. Putting the transcribing device 11 in the "record" mode simultaneously causes the tape transport mechanism 45 to transport the magnetic tape 43 past the record/playback head 41 in a forward direction at a constant, high speed.

After the reverse message information from the telephone answering apparatus 13 has been transcribed or recorded onto the magnetic tape 23, playback of the information is subsequently accomplished by closing the record/playback switch 39 to open contacts 39a and close the normally open contacts 39b interconnecting the record/playback head 41 and the input of a playback amplifier 47. The output of the playback amplifier 47, in turn, is coupled to a local playback transducer 49 which is referenced to ground. The tape transport mechanism 45 is simultaneously switched to a slower rewind mode of operation while the reverse recorded message information is played back through the playback amplifier 47. Accordingly, when the reverse recorded information is played back in reverse from the transcribing device 11, it is reproduced in the forward direction to give proper sound reproduction of the message.

By recording all the information from the automatic telephone answering apparatus 13 at high speed and in the reverse direction, the telephone line 19 is tied up only for the duration of the accelerated rewind-record operation of the apparatus 13. Accordingly, ten minutes of message information can be condensed into, for example, one minute, and when the sub-miniature remote control transcribing device 11 is placed in the playback mode, the tape transport system automatically shifts into a slow speed which is a fraction of a fast recording speed. For example, if the fast forward speed is 30 inches per second, the normal playback speed is about 3 inches per second. Thus, playing the recorded information back at one-tenth of the speed in the opposite direction will give the original conversation recorded on the answering apparatus 13.

In accordance with one aspect of the present invention, the transcribing device 11 also includes a numerical tape position indicator 51 coupled to the tape transport mechanism 45 for providing a visual indication of the amount of tape that has been used in transcribing the recorded messages from the answering apparatus 13. The tape position indicator 51 also informs the user of the position of the tape with respect to the record/playback head of transcribing device 11.

Accordingly, there has been shown a remote control transcribing device for retrieving message information recorded by automatic telephone answering apparatus in the subscriber's absence. The remote control transcribing device provides means for controlling a tape recorder such as that incorporated in an automatic telephone answering apparatus from a remote location by impressing tone signals on the telephone line to gain access to the answering apparatus 13. The transcribing device also provides means for transcribing message information from the answering apparatus more efficiently at higher speeds and with a minimum of on-line time. In addition, the apparatus includes means for providing a visual indication of the amount of message information transcribed and a positive indication of tape position. Accordingly, once the information is transcribed by the remote control transcribing device, the subscriber can repeat or replay it as often as desired without tying up a telephone trunk circuit.

While a particular embodiment of the present invention has been shown and described, it will be obvious to those skilled in the art that various changes and modifications may be made without departing from the invention in its broader aspects. Accordingly, the aim in the appended claims is to cover all such changes and modifications as should fall within the true spirit and scope of the invention.

What is claimed is:

1. Remote control transcribing apparatus for controlling a remotely located tape recorder apparatus and retrieving message information therefrom wherein said tape recorder apparatus is operable in a high speed rewind mode and said transcribing apparatus includes tape transport means for transporting a magnetic recording tape in a forward direction and a reverse direction past a record/playback head, said transcribing apparatus comprising:

means for generating a tone of predetermined frequency and selectively applying said tone to said remote tape recorder to switch said remote tape recorder into said high speed rewind mode to play back said message information in reverse;

means for coupling said reverse message information to said record/playback head, said record/playback head magnetically recording said reverse message information on said tape at high speed in said forward direction;

means for switching said tape transport means to transport said tape in said reverse direction at low speed; and means coupled to said record/playback head for playing back said reverse message information as said tape is transported in said reverse direction.

2. Apparatus in accordance with claim 1 including visual indicator means coupled to said tape transport means for providing a visual indication of the amount of said message information transcribed and a positive indication of the position of said tape with respect to said record/playback head.

3. Remote control transcribing apparatus for controlling a remotely located tape recorder apparatus and retrieving message information therefrom wherein said tape recorder apparatus is operable in a high speed rewind mode and said transcribing apparatus includes tape transport means for transporting a magnetic recording tape in a forward direction and a reverse direction past a record/playback head, said transcribing apparatus comprising:

oscillator means for generating a signal of predetermined frequency;

transducer means coupled to said oscillator means for converting said signal to a corresponding audio tone and for selectively applying said tone to said remote tape recorder to switch said remote tape recorder into said high speed rewind mode to play back said message information in reverse, said transducer means subsequently coupling said reverse message information to said record/playback head, said record/playback head magnetically recording said reverse message information on said tape at high speed in said forward direction;

switch means for switching said tape transport means to transport said tape in said reverse direction at low speed; and playback means coupled to said record/playback head for playing back said reverse message information as said tape is transported in said reverse direction.

4. Apparatus in accordance with claim 3 including second switch means having a first pair of normally open contacts intercoupling said oscillator means and said transducer means and further having a second pair of normally closed contacts intercoupling said transducer means and said record/playback head, said second switch means being selectably enabled to close said normally open contacts and open said normally closed contacts to couple said oscillator signal to said transducer means to switch said remote tape recorder into said high speed rewind mode, said reverse message information being subsequently coupled to said record/playback head through said normally closed contacts when said second switch means is disabled.

5. Apparatus in accordance with claim 4 including record amplifier means intercoupling said normally closed contacts and said record/playback head for amplifying said reverse message information prior to recording on said tape and wherein said playback means includes playback amplifier means coupled to said record/playback head for amplifying said message information during playback, said playback amplifier means including playback transducer means for converting said message information into audio signals.

6. Apparatus in accordance with claim 5 wherein said switch means comprises a first pair of normally closed contacts intercoupling said record amplifier means and said record/playback head and a second pair of normally open contacts intercoupling said record/playback head and said playback amplifier means, said switch means being selectably enabled to close said normally open contacts and open said normally closed contacts to couple said message information to said playback amplifier means for playback, said reverse being coupled to said record/playback head through said normally closed contacts when said switch means and said second switch means are disabled.

7. Apparatus in accordance with claim 3 including visual indicator means coupled to said tape transport means for providing a visual indication of the amount of said message information transcribed and a positive indication of the position of said tape with respect to said record/playback head.

* * * * *